(12) United States Patent
Xie et al.

(10) Patent No.: US 9,047,267 B2
(45) Date of Patent: Jun. 2, 2015

(54) METHOD, APPARATUS, AND COMPUTER PROGRAM PRODUCT FOR WRITTEN MATHEMATICAL EXPRESSION ANALYSIS

(75) Inventors: Xiaohui Xie, Beijing (CN); Yanming Zou, Beijing (CN); Yingfei Liu, Beijing (CN); Kongqiao Wang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 956 days.

(21) Appl. No.: 12/431,908

(22) Filed: Apr. 29, 2009

(65) Prior Publication Data

US 2010/0281350 A1 Nov. 4, 2010

(51) Int. Cl.
| | |
|---|---|
| *G06F 11/07* | (2006.01) |
| *G06K 9/00* | (2006.01) |
| *G06F 17/30* | (2006.01) |
| *G06F 17/27* | (2006.01) |
| *G06K 9/46* | (2006.01) |

(52) U.S. Cl.
CPC ............ *G06F 17/271* (2013.01); *G06F 17/274* (2013.01); *G06K 9/468* (2013.01); *G06K 2209/01* (2013.01)

(58) Field of Classification Search
CPC . G06F 17/271; G06F 17/274; G06F 17/2735; G06K 2209/01; G06K 9/468
USPC ........................................................ 382/189
See application file for complete search history.

(56) References Cited

U.S. PATENT DOCUMENTS

| | | | | |
|---|---|---|---|---|
| 5,544,262 | A | * 8/1996 | Pagallo .......................... | 382/189 |
| 5,559,939 | A | * 9/1996 | Wada et al. .................... | 715/267 |
| 2006/0062471 | A1 | 3/2006 | Xu et al. | |

OTHER PUBLICATIONS

Error detection, error correction and performanace evaluation in on-line mathematical expression recognition, Chan et al, Pattern Recognition 2001, vol. 34 Issue 8, pp. 1671-1684.*
LaViola Jr., J.J. "An initial evaluation of a pen-based tool for creating dynamic mathematical illustrations", *In the Proceedings of the Eurographics Workshop on Sketch-Based Interfaces and Modelling*, 157-164, 2006.
Shilman M., et al., "CueTIP: a mixed-initiative interface for correcting handwriting errors", *In Symposium on User Interface Software and Technology*, ACM, 323-332, 2006.
Igarashi T., et al., "Interactive Beautification: A Technique for Rapid Geometric Design", *In Symposium on User Interface Software and Technology*, ACM, 105-114, 1997.
Chan, K. et al., *Error Detection, Error Correction and Performance Evaluation in On-Line Mathematical Expression Recognition*, Pattern Recognition, vol. 34, Issue 8, Aug. 2001, pp. 1671-1684.
International Search Report and Written Opinion for Application No. PCT/IB2010/000979 dated Aug. 26, 2010.
Office Action for Korean Application No. 10-2011-7028566; dated Apr. 4, 2013.

(Continued)

*Primary Examiner* — Kim Vu
*Assistant Examiner* — Michael Vanchy, Jr.
(74) *Attorney, Agent, or Firm* — Alston & Bird LLP

(57) ABSTRACT

Various methods for written mathematical expression analysis are provided. One method may include receiving written input where the written input is representative of a mathematical expression. The method may also include analyzing the written input to identify at least one operator and at least one operand and constructing an expression tree based at least in part on predefined symbol relationships, the at least one operator, and the at least one operand. Similar apparatuses and computer program products are also provided.

17 Claims, 12 Drawing Sheets

(56) References Cited

OTHER PUBLICATIONS

Office Action for Chinese Patent Application 201080025897.3 dated Mar. 8, 2013.
Error detection, error correction and performance evaluation in on-line mathematical expression recognition, Kam-Fai et al, Pattern Recognition, vol. 34 Issue 8, pp. 1671-1684.
Office Action for Korean Application No. 10-2011-7028566; dated Oct. 29, 2013.
Office Action for Chinese Application No. 201080025897.3 dated Nov. 14, 2013.
Office Action for Korean Application No. 2011-7028566 dated Apr. 28, 2014.
Office Action for Chinese Application No. 201080025897.3 dated May 30, 2014.
Office Action for Chinese Application No. 201080025897.3 dated Dec. 15, 2014.

* cited by examiner

| Right / left | empty | values | op | + | - | *(x) | /(÷) | ( | ) | () | < | frac | sqrt | = | funcs |
|---|---|---|---|---|---|---|---|---|---|---|---|---|---|---|---|
| empty | ok | values | values | ok | ok | values | values | invalid char | invalid char | ok | values | ok | ok | values | ok |
| invalid char | invalid | invalid | invalid | invalid | invalid | invalid | invalid | invalid | invalid | invalid | invalid | invalid | invalid | invalid | invalid |
| values | ok | char | char | char | char | char | char | char | char | char | char | char | char | char | char |
| nop | values | op | ok | ok | ok | ok | ok | op | op | op | ok | op | op | ok | op |
| + | values | ok | values | values | values | values | values | ( | ) |  | values | ok | ok | values | ok |
| - | values | ok | values | values | values | values | values | ( | ) |  | values | ok | ok | values | ok |
| *(x) | values | ok | values | values | values | values | values | ( | ) |  | values | ok | ok | values | ok |
| /(÷) | values | ok | values | values | values | values | values | ( | ) |  | values | ok | ok | values | ok |
| ( | ( | ( | ( | ( | ( | ( | ( | ( | values | ( | ( | ( | ( | ( | ( |
| ) | ) | ) | ) | ) | ) | ) | ) | values | ) | ) | ) | ) | ) | ) | ) |
| () | ok | op | ok | ok | ok | ok | ok | op |  | op | ok | op | op | ok | op |
| < | values | ok | values | values | values | values | values | ( | op | ( | values | ok | ok | values | ok |
| frac | ok | op | ok | ok | ok | ok | ok | op | op | op | ok | op | op | ok | op |
| sqrt | ok | op | ok | ok | ok | ok | ok | op | op | op | ok | op | op | ok | op |
| = | values | ok | values | values | values | values | values | ( | ) | ok | values | ok | ok | ok | ok |
| funcs | ok | op | ok | ok | ok | ok | ok | op | op | op | ok | op | op | ok | op |

Rule 1 – Division By Zero
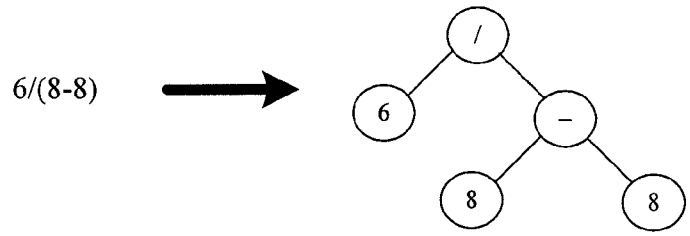
Rule 2 – Function Missing Parameters
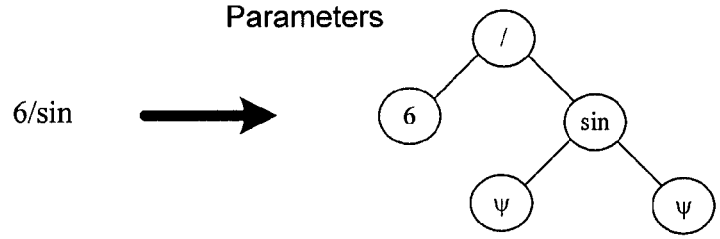
Rule 3 – Square Root Sign Too Short
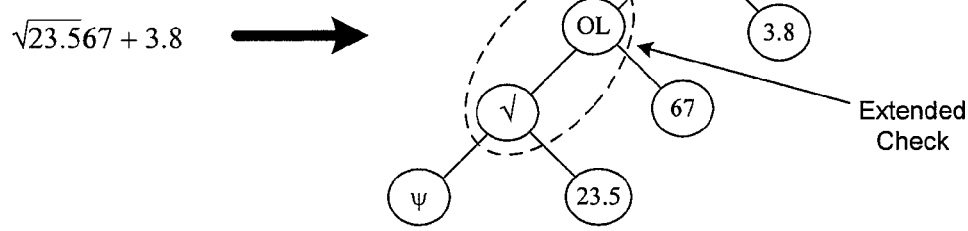
Rule 4 – Segmentation Error
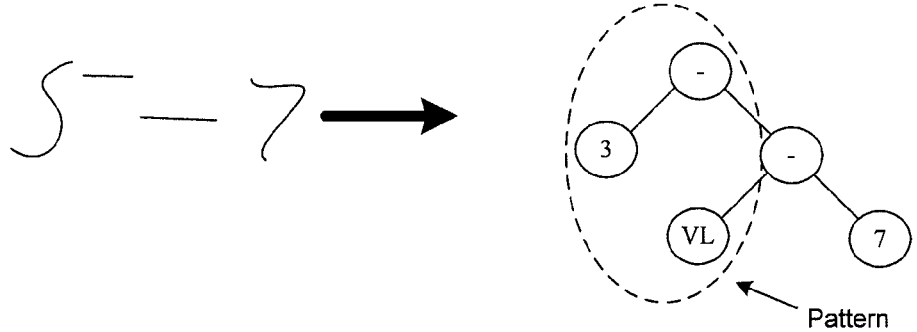
FIG. 6

Recognition Errors - 
Lost Operators - 
Lost Operands - 
Lost Left Parenthesis - 
Lost Right Parenthesis - 
Division By Zero - 
Splitting Segmentation Error - 
Combining Segmentation Error - 
Square Root Extension Error - 
FIG. 7

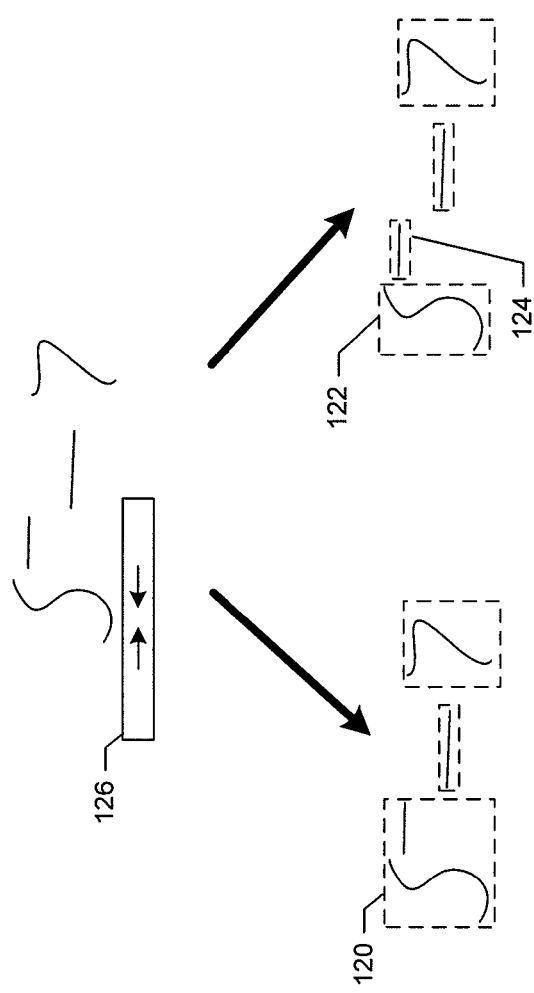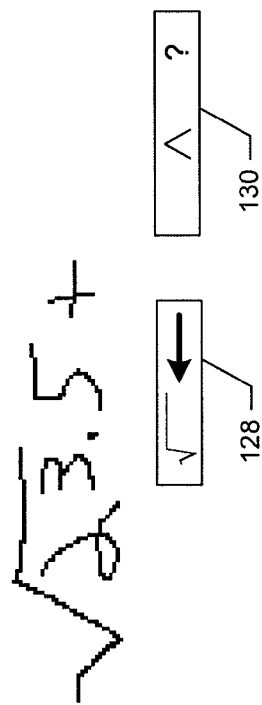
FIG. 8a
FIG. 8b

METHOD, APPARATUS, AND COMPUTER PROGRAM PRODUCT FOR WRITTEN MATHEMATICAL EXPRESSION ANALYSIS

TECHNICAL FIELD

Embodiments of the present invention relate generally to data entry, and, more particularly, relate to a method, apparatus, and a computer program product for analyzing written mathematical expressions on a touch screen display.

BACKGROUND

Advances in display technology have resulted in the implementation of touch screen displays as user interface mechanisms for various types of the electronic devices including mobile communications devices. In particular, touch screen displays have been utilized in cellular telephone applications, as well as tablet personal computer applications. As a part of the user interface of an electronic device, a touch screen display not only provides an output mechanism to the user by displaying images and/or text, but also receives input associated with a user's touching of the screen.

Touch screen displays allow for a more natural interface between a user and a device by adding increased convenience over a conventional keypad. Via a touch screen display, users often enjoy a more intuitive data input and output interface. Due to the intuitive nature of touch screen displays, developers of electronic devices are tending to incorporate touch screen technology into many applications where electronic devices are utilized, particularly in mobile device applications.

An evolving application for touch screen technology is within the realm of mathematic expression entry. The use of many non-touch screen keypad calculators introduces a disconnect between how a mathematical expression is written on a piece of paper, versus how a mathematical expression is entered into the calculator. Also, due to the limited number of keys on a keypad calculator, expression entry may be cumbersome and awkward for a user.

BRIEF SUMMARY

Methods, apparatuses, and computer program products are described that implement written mathematical expression analysis. In this regard, various example embodiments of the present invention receive written input via a touch screen display. The written input may be representative of a mathematical expression entered by a user via the touch screen display. The written input may be decomposed or dissected into portions attributed to operands (e.g., values) and operators (e.g., addition sign, subtraction sign, multiplication sign, square root sign, etc.). The operators and operands may be used to construct an expression tree. According to some example embodiments, the expression tree may be constructed as a self-contained complete binary tree. The expression tree may be constructed based on predefined symbol relationships between operators and operands. Based on the predefined symbol relationships, example embodiments of the present invention may insert placeholders into the expression tree for missing elements. The expression tree may be analyzed for errors based on one or more predefined rules and/or the predefined symbol relationships. If errors are present, example embodiments of the present invention may provide feedback to the user in form of displayed feedback messages.

Various example embodiments of the present invention are described herein. One example embodiment is a method for written mathematical expression analysis. The example method includes receiving written input. In this regard, the written input may be representative of a mathematical expression. The example method may also include analyzing the written input to identify at least one operator and at least one operand and constructing an expression tree based at least in part on predefined symbol relationships, the at least one operator, and the at least one operand.

Another example embodiment is an example apparatus for written mathematical expression analysis. The example apparatus comprises a processor and a memory storing instructions that, in response to execution of the instructions by the processor, cause the example apparatus to perform various functions. The example apparatus may be caused to receive written input. In this regard, the written input may be representative of a mathematical expression. The example apparatus may be further caused to analyze the written input to identify at least one operator and at least one operand and construct an expression tree based at least in part on predefined symbol relationships, the at least one operator, and the at least one operand.

Another example embodiment is an example computer program product for written mathematical expression analysis. The example computer program product comprises at least one computer-readable storage medium having executable computer-readable program code instructions stored therein. The computer-readable program code instructions of the example computer program product are configured to receive written input. In this regard, the written input may be representative of a mathematical expression. The computer-readable program code instructions may be further configured to analyze the written input to identify at least one operator and at least one operand and construct an expression tree based at least in part on predefined symbol relationships, the at least one operator, and the at least one operand.

Yet another example embodiment is an apparatus for written mathematical expression analysis. The example apparatus includes means for receiving written input. In this regard, the written input may be representative of a mathematical expression. The example apparatus may also include means for analyzing the written input to identify at least one operator and at least one operand and means for constructing an expression tree based at least in part on predefined symbol relationships, the at least one operator, and the at least one operand.

BRIEF DESCRIPTION OF THE DRAWING(S)

Having thus described the invention in general terms, reference will now be made to the accompanying drawings, which are not necessarily drawn to scale, and wherein:

FIG. 1*a* illustrates an example touch screen display device according to various example embodiments of the present invention;

FIG. 1*b* illustrates an example expression tree according to various example embodiments of the present invention;

FIG. 2 illustrates example matrix including symbol relationships according to various example embodiments of the present invention;

Figure 5A:
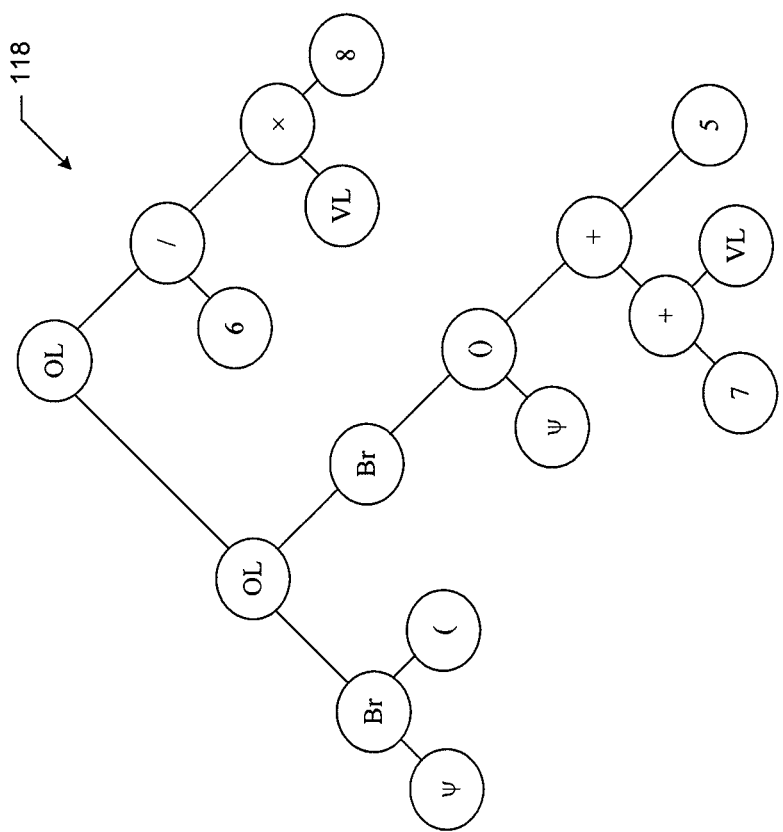
Figure 5B:
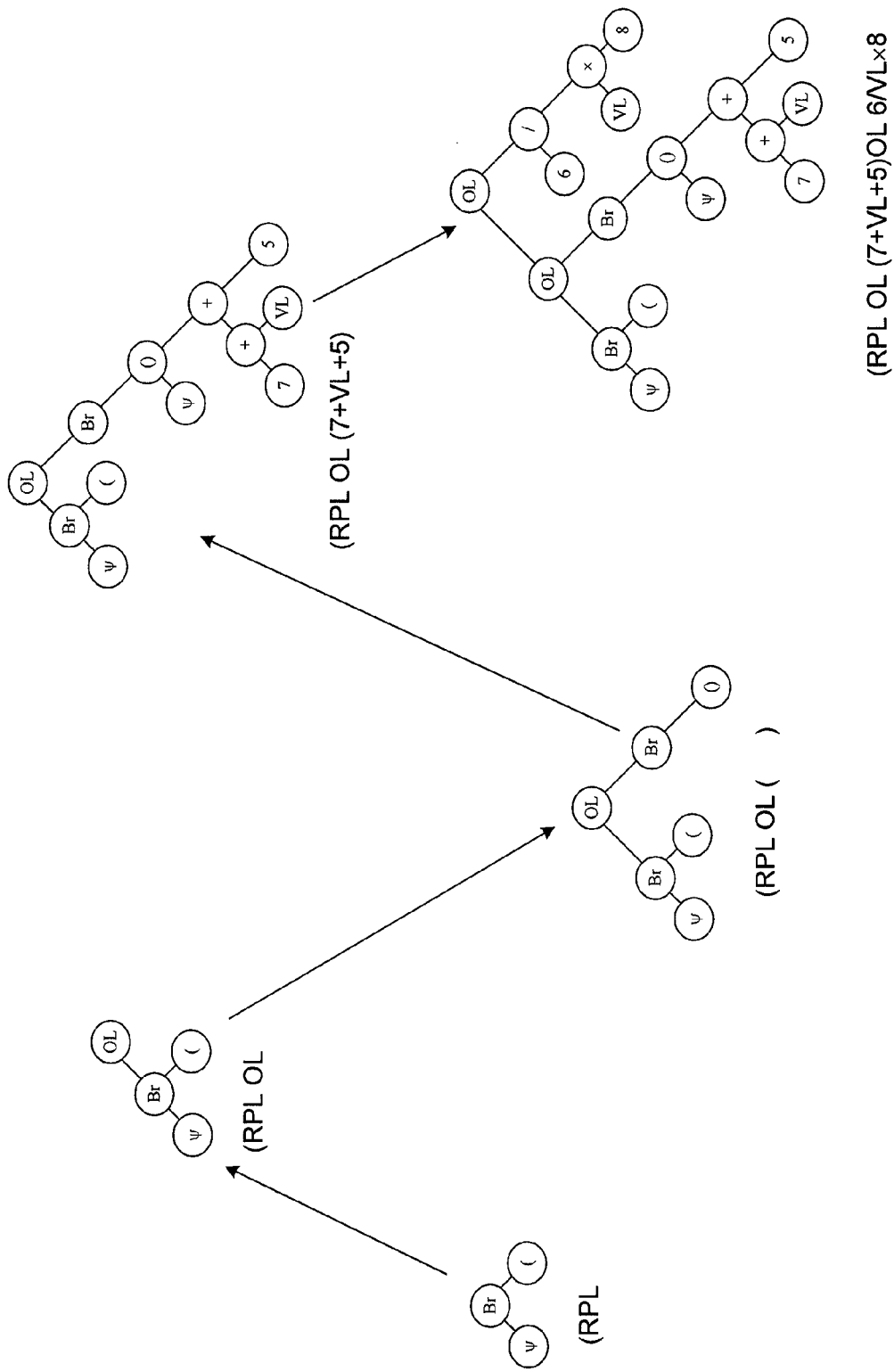
Figure 9A:
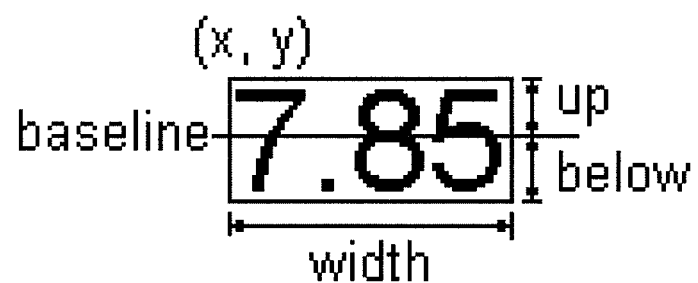
Figure 9B:
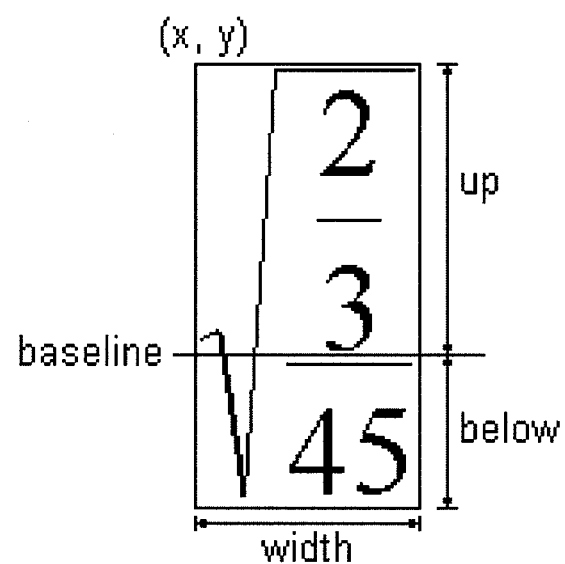
Figure 10:
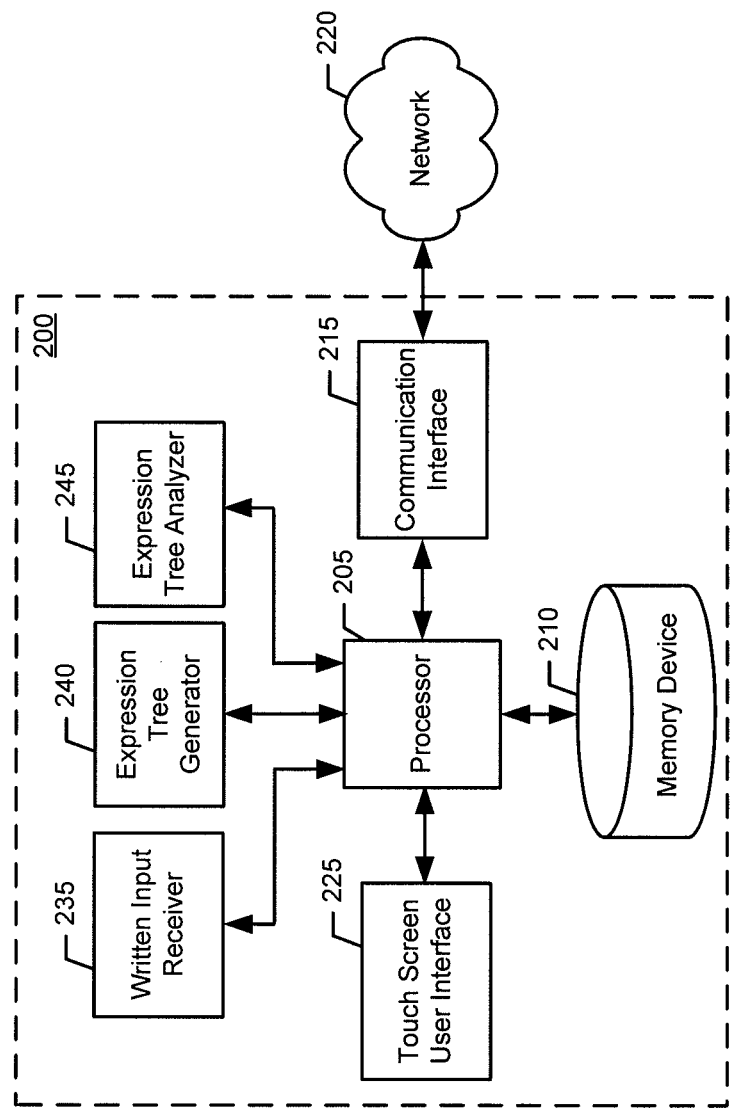
Figure 11:
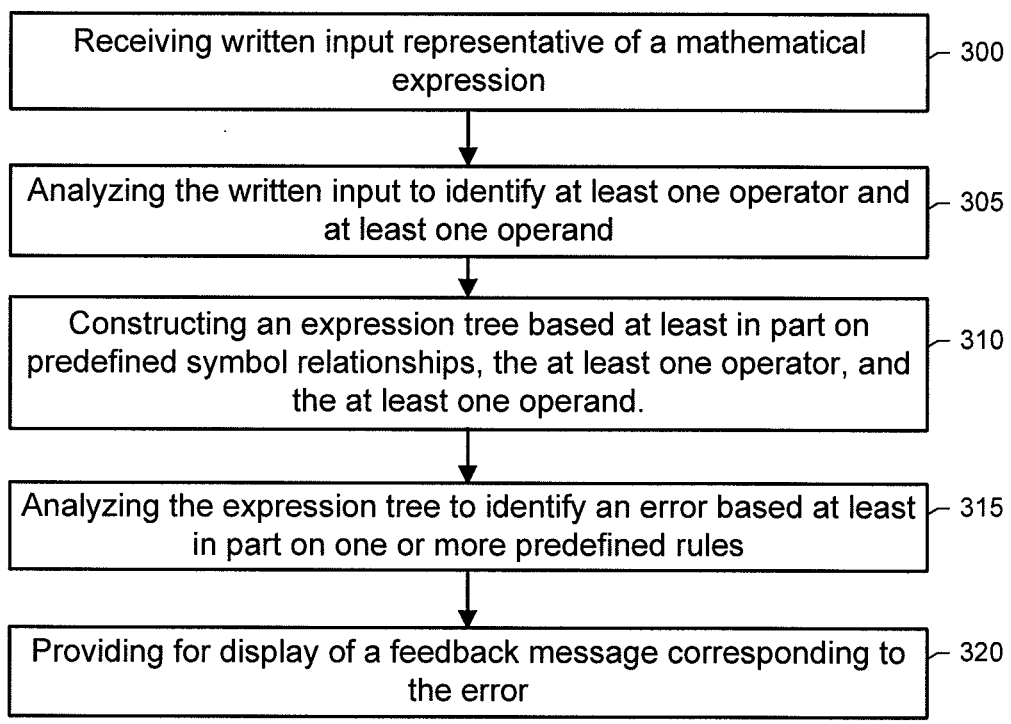

FIG. 5*a* illustrates an example expression tree according to various example embodiments of the present invention;

FIG. 5b illustrates a series of incremental operations for determining the example expression tree of FIG. 5a according to various example embodiments of the present invention;

FIG. 6 illustrates example expression tree analysis rules according to various example embodiments of the present invention;

FIG. 7 illustrates example feedback messages according to various example embodiments of the present invention;

FIGS. 8a and 8b illustrate implementations of feedback rules according to various example embodiments of the present invention;

FIGS. 9a and 9b illustrate example formatted expressions according to various example embodiments of the present invention;

FIG. 10 illustrates a block diagram of an apparatus for implementing written mathematical expression analysis according to various example embodiments of the present invention; and FIG. 11 depicts flowcharts of methods for implementing written mathematical expression analysis according to various example embodiments of the present invention.

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. Moreover, the term "exemplary," as used herein, is not provided to convey any qualitative assessment, but instead to merely convey an illustration of an example.

As used herein, the phase "written input" refers to handwritten data entry such as via a stylus, finger, pen, other writing implement, or the like. In this regard, according to some example embodiments, written input may be data received by a touch screen display in the form of handwritten markings representative of mathematical expressions.

Figure 1A:
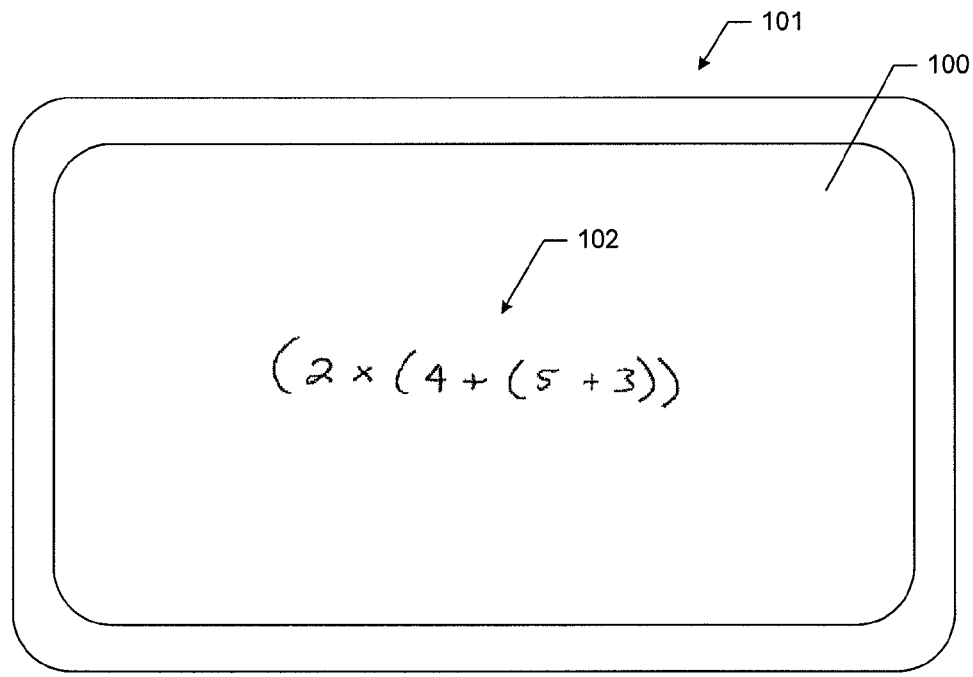

Example embodiments of the present invention receive data as written input in the form of a mathematical expression. The written input may be formatted as a mathematical expression by a user and received by an electronic device via a touch screen display. FIG. 1a depicts an example touch screen display 100 of an electronic device 101 that has received written input 102 in the form of a mathematical expression. The written input 102 may be analyzed by example embodiments of the present invention to dissect or decompose the written input 102 to be interpreted as a mathematical expression.

Figure 1B:
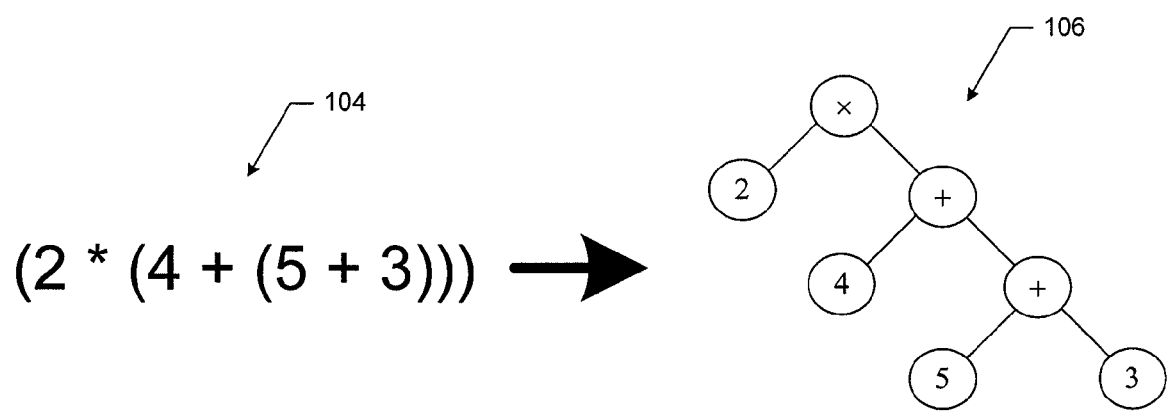

In this regard, FIG. 1b depicts the mathematical expression 104 corresponding to the written input 102. Based on a decomposition of the mathematical expression 102 into operators and operands, an expression tree 106 may be generated by various embodiments of the present invention. The expression tree 106 may be stored as a data structure in a memory device of the electronic device 101. While the user is entering the written input 102, or upon completion, the electronic device may analyze the expression tree 106 for errors. If and/or when an error in the entry of a mathematical expression is identified, the electronic device may be configured to provide a user with a feedback message or hint as to how to rectify the error. If an expression includes no errors, or if errors have been rectified, the electronic device 101 may evaluate the expression and provide and/or display a result.

Calculating a result of a mathematical expression based on an expression tree may be performed in a number of equivalent, but differently constructed, ways based on how an evaluation algorithm moves through the expression tree. For example, an infix mechanism may be utilized where the operator comes between its two operands. Alternatively, a prefix mechanism may be utilized where the operator comes before its two operands, or a postfix mechanism may be utilized where the operator comes after its two operands. Given an expression tree, embodiments of the present invention may generate results in accordance with an infix, prefix, or postfix mechanism.

Towards a goal of reliable evaluation of a mathematical expression based on written input, example embodiments of the present invention identify errors in a mathematical expression, and in the underlying written input, and provide feedback to the user to rectify the errors. In this regard, errors may be classified into a number of types, including user writing error, recognition error, and expression parser error.

A user writing error may occur as a result of poor or incomprehensible handwriting and/or stray markings. Deletion and re-writing of some or all of a portion of the written input may be one mechanism for remedying user writing errors.

Recognition errors may be the result of a handwriting recognition engine failing to properly identify some or all of the written input. Recognition errors may be separated in three subtypes, namely symbol recognition errors, symbol grouping errors, and symbol positioning errors. An example of a symbol recognition error may be a written "7" being recognized as a "1." An example of a symbol grouping error may be a written "5" being recognized as a "3" followed by a subtraction sign, "−." Further, an example of a symbol positioning error may occur when a square root sign fails to extend completely over an operand (see FIG. 8b), and the portion not covered by the square root sign is considered as a separate operand, rather than a single operand under the square root sign. According to some example embodiments, and as further described below, feedback messages may be provided to a user to assist in remedying and/or preventing recognition errors.

Expression parser errors may be identified when an evaluation of the mathematical expression is nonsensical or improper. For example, an expression parser error may occur when an evaluation of a mathematical expression includes a division by zero. The presence of missing operators or operands within the mathematical expression may also result in an expression parser error. Similar to recognition errors, according to some example embodiments as further described below, feedback messages may be provided to a user to assist in remedying and/or preventing expression parser errors.

Feedback messages, as mentioned above, may be provided in response to errors identified within written input and/or a mathematical expression based on the written input. Feedback messages may also be provided in a proactive manner to avoid errors. In this regard, a feedback message may be provided to suggest or recommend ways of completing or adding to an expression. For example, having provided an open parenthesis, example embodiments of the present invention may suggest that a closed parenthesis could be added to the expression. In this regard, feedback messages may be triggered by incomplete expressions or via the identification of candidate symbols or expressions.

To facilitate the recognition of expression errors and/or make suggestions, various example embodiments of the present invention generate an expression tree, such as the expression tree 106. The expression tree may be generated as a self-contained complete binary expression tree. According to various example embodiments, a complete binary tree is a binary tree in which every level, except possibly the last, is completely filled, and all nodes are as far left as possible. Additionally, according to some example embodiments, in a self-contained tree, information is provided by the tree itself, where the information may be error correction position, error type, revision methods etc. In an expression tree, the parent nodes may be the operators, and the children may be the operands.

To generate an expression tree, example embodiments of the present invention may parse or decompose the written input on a symbol by symbol basis. The symbols may then be analyzed with respect to predefined symbol relationships. The predefined symbol relationships may indicate whether nodes of an expression tree should be inserted, due to a missing operator, missing operand, or a missing parenthesis.

The symbol relationships may be organized in a symbol relationship matrix. FIG. 2 depicts an example symbol relationship matrix for use in constructing an expression tree. To use the symbol relationship matrix of FIG. 2, the content of a right child node (along the top row) and the content of the left child node (along the left-most column) may be identified and considered. The location within the matrix where the content-types meet can determine what information may be provided in the parent node. Thus, the symbol relationships may be generated that support interactions between, and amongst, operators and operands. The defined relationships may be the basis for identifying erroneous expressions or erroneous portions of an expression. The symbol relationships may also provide a basis for making suggestions for properly completing an expression or a portion of an expression.

For example, if a right child node includes a value (referring to "values" in the top row) and the left child node includes a value (referring to "values" in the left-most column), the content types may meet at a cell indicating "op." This relationship indicates that when both children nodes have values, a parent node should have an operator. If during construction of the expression tree it is determined that an operator is not included in the parent node, based on the written input, a missing operator node may be inserted into the expression tree. If an operator is included in the parent node, then no missing operator node need be added to the tree and an error has not been identified.

Accordingly, symbol relationships may be defined for a variety of operators and operands including empty nodes, values (e.g., e, π, numerals, radix points, etc.), not-known-operator (nop), equals sign ("="), addition sign ("+"), subtraction sign ("−"), multiplication sign ("*" or "×"), division sign ("/" or "÷"), fraction sign, single left parenthesis ("("), single right parenthesis (")"), parenthesis pair ("( )"), power sign ("^"), square root sign ("√"), functions (e.g., \answer{answer value}, \sin {parameter}, \cos {parameter}, etc.), or the like. Also, the predefined symbol relationships may be extended to include additional operator types, such as Π (n-array product), Σ(n-element sum), and ∫(integration).

Further, the symbol relationships may be defined to support alternative expressions that have equivalent meanings. For example, a symbol relationship may be defined for situations where a multiplication sign is not included due to the presence of a parenthesis (e.g., the difference between 7(2+3) and 7*(2+3) which may be considered equivalent expressions). To introduce such a relationship to the matrix, modification to the cell having the left child as "values" and the right child as "( )" may be performed.

As example embodiments generate the expression tree, situations may arise where, based on the predefined symbol relationships, nodes may be added to or inserted into the expression tree. For example, a missing or lost operator node (denoted by "OL" herein), an empty node (denoted as "Ψ" herein), or a missing or lost value node (denoted as "VL" herein) may be added or inserted into the expression tree. Further, missing parenthesis may also cause the insertion or addition of nodes, such as a missing or lost right or left parenthesis (denoted as "RPL" or "LPL," respectively, herein). Also due to the effect of parentheses on the generation of the expression tree, nodes may be added when nested parentheses are included in the expression. In this regard, a branching of the tree may occur (denoted by "Br" herein) in the generation of the expression tree.

Errors may occur in situations where the composition of the mathematical expression does not conform to the predefined symbol relationships. In this regard, nodes of the generated expression tree may be associated with a node status value. The node status may be set, based upon the predefined symbol relationships, to a normal or abnormal status. For example, a missing operator node or a missing value node may be assigned an abnormal status. According to various example embodiments, feedback messages may be based, at least in part, on the value of a status associated with a node.

Figure 3:
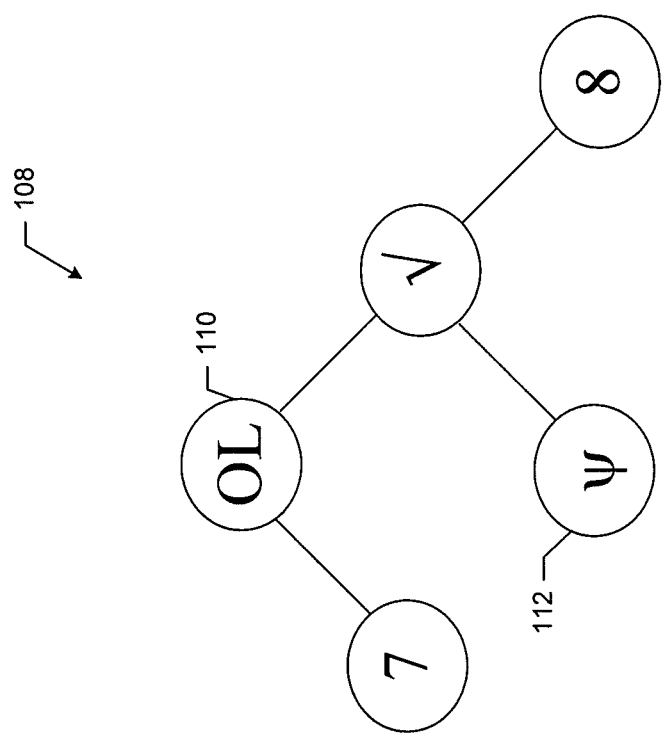
FIG. 3 illustrates an example expression tree according to various example embodiments of the present invention.

FIGS. 3-5a depict example expression trees generated in accordance with various example embodiments of the present invention. FIG. 3 depicts an expression tree 108 where the written input has been determined to be "7sqrt8." The expression tree 108 includes inserted nodes 110 and 112, in addition to nodes associated with the symbols identified in the corresponding written input. Node 110 is a missing operator node, due to a symbol relationship indicating that an operator may be required as a parent of a child node being a value and another child node being a square root sign. Also, node 112 is an empty node that is a child of the square root sign node. A symbol relationship may indicate that an empty node in the position of node 112 may be acceptable, since a square root operation may be assumed when no root value is provided. Accordingly, based on the expression tree 108, a feedback message may be provided indicating that a missing operator is needed.

Figure 4:
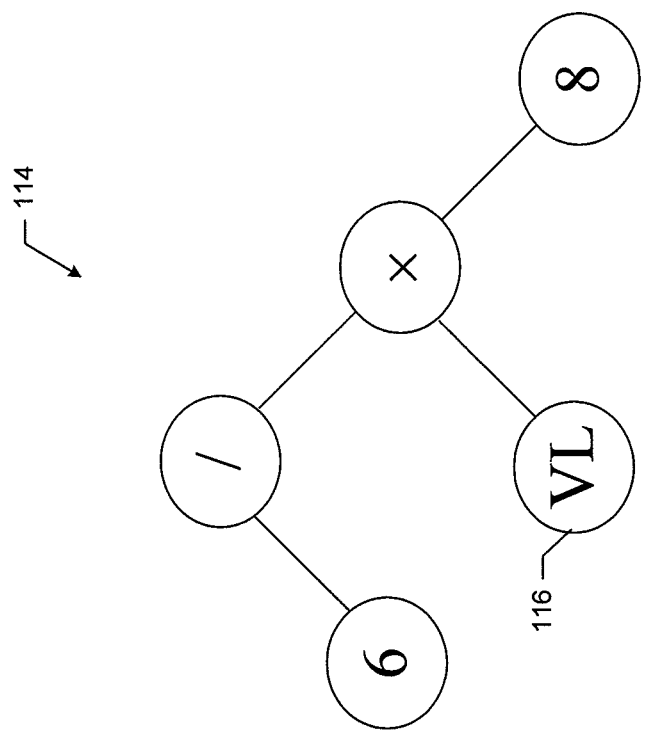
FIG. 4 illustrates an example expression tree according to various example embodiments of the present invention.

FIG. 4 depicts another example of an expression tree generated based on the mathematical expression "6/×8." The expression tree 114 of FIG. 4 includes a missing value node 116. The missing value node 116 may have been inserted in response to a symbol relationship indicating that a value is required between the "/" and "×" symbols.

FIG. 5a depicts a more complex example of an expression tree that includes a missing parenthesis. According to some example embodiments of the present invention, a textual version of the mathematical expression derived from the written input may be generated. With respect to FIG. 5, the written input may be a written version of the expression "((7++5)6/× 8," and the textual version may be "(RPL OL(7+VL+5)OL6/ VL×8." The expression tree 118, may include missing operator nodes and missing value nodes, due to the errors in the expression. FIG. 5b depicts an example serial process for generating the expression tree 118 in FIG. 5a.

Generating an expression tree may be a recursive process. Given written input in the form of a mathematical expression with properly recognized grammar, many known methods exist for generating the expression tree after operation priority is defined for values and operators. However, example embodiments of the present invention also consider brackets, and brackets in the written input may be introduced into an expression tree due to operator priority. The introduced brackets due to operator priority may be represented to a user in a different manner to allow for the differentiation between brackets introduced by the user via the written input and brackets automatically inserted due to operator priority. Also, according to some example embodiments, supplementary symbols such as VL, OL, RPL, or the like may be used in the generation of an expression tree. The supplementary symbols may be assigned operation priority, such as priority of VL may be the same amongst the values, OL may be the same as "+,-," and RPL's operation priority may be lower than operator, the same as values, etc.

Accordingly, based on the symbol relationships an expression tree, and in some example embodiments, a self-contained complete binary expression tree may be generated. Information within the expression tree, such as missing operators or missing values, may be used to provide feedback messages to the user to remedy or avoid errors, or make suggestions.

To facilitate the generation of feedback messages, evaluation rules for analyzing the expression tree may be defined. For example, division by zero rules, square root auto-extending rules, segmentation rules, or the like may be defined. According to various example embodiments, an analysis of an expression tree in consideration of the rules may provide a basis for generating a feedback message.

FIG. 6 depicts four example rules that may be considered when generating feedback messages. The first rule considers situations that involve a division by zero. In this regard, example embodiments of the present invention may evaluate a sub-tree, possibly the right sub-tree, of a node that includes a division sign to determine if a division by zero may occur. In some example embodiments, a threshold value may be set such that when the result of a sub-tree fall below the threshold value, a division by zero is identified. In some example embodiments, an order of operations rule may also be in place and, as a result, division by zero in the example provided in Rule 1 of FIG. 6 may be avoided.

Rule 2 of FIG. 6 addresses the use of functions with missing parameters. In this regard, a symbol relationship or a rule may be used to identify situations where the necessary parameters of a function are not satisfied. In the example associated with Rule 2 of FIG. 6, the sin function has an empty right parameter and is therefore in violation of the rule. An analysis in this regard would determine that, for example, the right child node of the sin node is empty. A feedback message may be provided to the user regarding the error.

Rule 3 of FIG. 6 addresses a situation where the square root sign fails to extend over all of the intended characters. An analysis of the expression tree may perform an extended check with respect to a square root node to determine if it is a child of a missing operator. If the missing operator also has a child that is a value, example embodiments may determine that the square root sign should be extended to cover the additional values. In some example embodiments, a distance between the end of the square root sign and the appended values may be determined with respect to a threshold difference to determine whether the appended value should be considered part of the value under the square root or not. Based upon the determination, example embodiments of the present invention may provide a feedback message or perform an auto-correction.

Rule 4 of FIG. 6 addresses segmentation errors that may occur with respect to the written input. In this regard, the example associated with Rule 4 includes markings that may be interpreted as a "5" or "3–" based upon how the written input is segmented. In the first instance, the corresponding mathematic expression is "5–7", while in the second instance the mathematical expression is "3––7." Common segmentation errors, such as this, may be identified via patterns within the expression tree. For example, when a parent node that includes a subtraction sign has children including a node with a 3 and a missing value grandchild node a pattern for the "5" versus the "3–" error may be identified. Associated feedback messages may be generated and provided to the user, or an auto-correction may be performed based upon an assumption that an error may not be introduced over a valid solution.

Based upon rules similar to those described with respect to FIG. 6, and/or the symbol relationships described with respect to FIG. 2, feedback messages may be provided to the user during or after entry of written input. FIG. 7 depicts a list of example feedback messages for various error and/or suggestion situations.

FIGS. 8a and 8b depict implementation of some example feedback messages in accordance with various example embodiments of the present invention. In this regard, FIG. 8a shows the how two distinct segmentation results may be determined from example written input. In this regard, the situation described with respect to Rule 4 of FIG. 6 is again depicted. Note that markings of the written input may be segmented in different ways resulting in a portion being interpreted as a "5" or a "3–". In this regard, the markings may be segmented into one portion 120 in a first option or two portions 122 and 124 in a second option. As a result of this ambiguity and an analysis with respect to Rule 4 of FIG. 6, a feedback message 126 may be provided to the user inquiring whether the marking should be combined into one segment or not.

FIG. 8b depicts an example scenario where a square root sign is not fully extended over all of the values and a missing or lost value is present. Due to the incomplete extension of the square root sign, feedback message 128 may be provided to the user indicating that the square root sign may be incomplete. Further, feedback message 130 may be provided due to the missing or lost value after the addition sign.

To provide additional feedback to the user while, or after, entering written input in the form of a mathematical expression, various example embodiments of the present invention may display the written input as a formatted expression. The formatted expression may provide the user additional feedback regarding how the written input is recognized, allowing the user to modify the written input to make corrections.

One example method of displaying the formatted expression is to use the expression tree to format and display the expression. The expression tree may be analyzed in a recursive fashion based on node tokens and node blocks, where node tokens are related to the nodes of an expression tree. In this regard, each node of the expression tree may have two groups of calculated values, a node token, and node block. The node token may include a token x position, a token baseline_position, a token width, a token height_on_baseline, and a token height_below_baseline. The node block may include a node block including an x position, a baseline_position, a width, a height_on_baseline, and a height_below_baseline. The node token may be the symbols of the node, while the node block may be a sub-tree of the node including the node's left and right child portions. A baseline may be used to align the sub-expressions in the same level.

FIGS. 9a and 9b depict examples of formatted expressions based on various example embodiments of the present invention. Referring to FIGS. 9a and 9b, example embodiments may calculate a token width, a token height (above and/or below the baseline), a block width, and a block height (above and/or below the baseline). Calculation may begin with an expression tree's leaves and move to the root in a recursive fashion.

Further, the node block x position, and the block baseline position may be calculated. Calculation with respect to the block may start from the root node. In some example embodiments, a root node's x position and baseline may be at coordinates (0, 0) on a grid system. The block calculations may also be performed recursively to calculate the children's block position based on the corresponding token and block values that were previously calculated.

The process may continue by calculating the token's x position, and the token's baseline position. The first calculation may also start from the root node, and then recursively calculate its children's token positions based on token and block values calculated previously. Additionally, example embodiments may determine all node positions by calculating the positions by performing a tree searching mechanism. The tree searching mechanism may operate times to determine the positions. Upon generating the expression for display, the expression may be sized in accordance with size profile of the display.

The description provided above and herein illustrates example methods, apparatuses, and computer program products for written mathematical expression analysis. FIG. 10 illustrates another example embodiment of the present invention in the form of an example apparatus 200 that is configured to perform various aspects of the present invention as described herein. The apparatus 200 may be configured to perform example methods of the present invention, such as those described with respect to FIG. 11.

In some example embodiments, the apparatus 200 may, but need not, be embodied as, or included as a component of, a communications device with wired or wireless communications capabilities. Some examples of the apparatus 200, or devices that may include the apparatus 200, may include a computer, a server, a network entity, a mobile terminal such as a mobile telephone, a portable digital assistant (PDA), a pager, a mobile television, a gaming device, a mobile computer, a laptop computer, a camera, a video recorder, an audio/video player, a radio, and/or a global positioning system (GPS) device, or any combination of the aforementioned, or the like. Further, the apparatus 200 may be configured to implement various aspects of the present invention as described herein including, for example, various example methods of the present invention, where the methods may be implemented by means of a hardware configured processor or a processor configured through the execution of instructions stored in a computer-readable storage medium, or the like.

The apparatus 200 may include or otherwise be in communication with a processor 205, a memory device 210, a written input receiver 235, a expression tree generator 240, and/or a expression tree analyzer 245. In some example embodiments, the apparatus 200 may optionally include a communications interface 215 and/or a touch screen user interface 225. The processor 205 may be embodied as various means implementing various functionality of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. In some example embodiments, the processor 205 may, but need not, include one or more accompanying digital signal processors. In some example embodiments, the processor 205 may be configured to execute instructions stored in the memory device 210 or instructions otherwise accessible to the processor 205. As such, whether configured by hardware or via instructions stored on a computer-readable storage medium, or by a combination thereof, the processor 205 may represent an entity capable of performing operations according to embodiments of the present invention while configured accordingly. Thus, for example, when the processor 205 is embodied as an ASIC, FPGA or the like, the processor 205 may be specifically configured hardware for conducting the operations described herein. Alternatively, when the processor 205 is embodied as an executor of instructions stored on a computer-readable storage medium, the instructions may specifically configure the processor 205 to perform the algorithms and operations described herein. However, in some cases, the processor 205 may be a processor of a specific device (e.g., a mobile terminal) configured for employing example embodiments of the present invention by further configuration of the processor 205 via executed instructions for performing the algorithms and operations described herein.

The memory device 210 may be one or more computer-readable storage media that may include volatile and/or non-volatile memory. For example, memory device 210 may include Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, or the like for enabling the processor 205 and the apparatus 200 to carry out various functions in accordance with example embodiments of the present invention. For example, the memory device 210 could be configured to buffer input data for processing by the processor 205. Additionally, or alternatively, the memory device 210 may be configured to store instructions for execution by the processor 205.

The communication interface 215 may be any device or means embodied in either hardware, a computer program product, or a combination of hardware and a computer program product that is configured to receive and/or transmit data from/to a network and/or any other device or module in communication with the apparatus 200. Processor 205 may also be configured to facilitate communications via the communications interface by, for example, controlling hardware included within the communications interface 215. In this regard, the communication interface 215 may include, for example, one or more antennas, a transmitter, a receiver, a transceiver and/or supporting hardware, including a processor for enabling communications with network 220. Via the communication interface 215 and the network 220, the apparatus 200 may communicate with various other network entities in a peer-to-peer fashion or via indirect communications via a base station, access point, server, gateway, router, or the like.

The communications interface 215 may be configured to provide for communications in accordance with any wired or wireless communication standard. The communications interface 215 may be configured to support communications in multiple antenna environments, such as multiple input multiple output (MIMO) environments. Further, the communications interface 215 may be configured to support orthogonal frequency division multiplexed (OFDM) signaling. In some example embodiments, the communications interface 215 may be configured to communicate in accordance with various techniques, such as, second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, and/or the like. Further, communications interface 215 may be configured to provide for communications in accordance with techniques such as, for example, radio frequency (RF), infrared (IrDA), Transmission Control Protocol/Internet Protocol (TCP/IP), and/or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wigbee and/or the like The touch screen user interface 225 may be in communication with the processor 205 to receive user input via the touch screen user interface 225 and/or to present output to a user as, for example, audible, visual, mechanical or other output indications. The user interface 225 may include, for example, a keyboard, a mouse, a joystick, a touch screen display, a microphone, a speaker, or other input/output mechanisms.

The written input receiver 235, the expression tree generator 240, and the expression tree analyzer 245 of apparatus 200 may be any means or device embodied, partially or wholly, in hardware, a computer program product, or a combination of hardware and a computer program product, such as processor 205 implementing stored instructions to configure the apparatus 200, or a hardware configured processor 205, that is configured to carry out the functions of the written input receiver 235, the expression tree generator 240, and/or the expression tree analyzer 245 as described herein. In an example embodiment, the processor 205 includes, or controls, the written input receiver 235, the expression tree generator 240, and/or the expression tree analyzer 245. The written input receiver 235, the expression tree generator 240, and/or the expression tree analyzer 245 may be, partially or wholly, embodied as processors similar to, but separate from processor 205. In this regard, the written input receiver 235, the expression tree generator 240, and/or the expression tree analyzer 245 may be in communication with the processor 205. In various example embodiments, the written input receiver 235, the expression tree generator 240, and/or the expression tree analyzer 245 may, partially or wholly, reside on differing apparatuses such that some or all of the functionality of the written input receiver 235, the expression tree generator 240, and/or the expression tree analyzer 245 may be performed by a first apparatus, and the remainder of the functionality of the written input receiver 235, the expression tree generator 240, and/or the expression tree analyzer 245 may be performed by one or more other apparatuses.

The written input receiver 235 may be configured to receive written input. The written input may be representative of a mathematical expression. In some example embodiments, the written input may be received from a user via a touch screen display, such as the touch screen display of the touch screen user interface 225.

The expression tree generator 240 may be configured to analyze the written input to identify at least one operator and at least one operand. The expression tree generator 240 may also be configured to construct an expression tree based at least in part on predefined symbol relationships, the at least one operator, and the at least one operand. In this regard, the expression tree generator 240 may access the predefined symbol relationships in the memory device 210. The predefined symbol relationships may be stored as a two-dimensional matrix or a table. In some example embodiments, the expression tree generator 240 may be configured to construct the expression tree as a self-contained complete binary tree. Additionally, or alternatively, the expression tree generator 240 may be configured to insert, based at least in part on the predefined symbol relationships, a placeholder within the expression tree for a missing operator, a missing operand, or a missing parenthesis. According to some example embodiments, the expression tree generator 240 may also construct a representation of a mathematical expression for display based at least in part on the expression tree. In this regard, the representation of the mathematical expression may be determined based on a recursive analysis of one or more node tokens and corresponding nodes blocks within the expression tree.

The expression tree analyzer 245 may be configured to analyze the expression tree to identify an error based at least in part on one or more predefined rules. According to various example embodiments, the expression tree analyzer 245 may be further configured to provide for the display of a feedback message corresponding to the error. The feedback message may be displayed on a touch screen display, such as the touch screen display of touch screen user interface 225. Further, the expression tree analyzer may also be configured to provide feedback messages as suggestions for future written input.

FIG. 11 illustrates one or more flowcharts of a system, method, and computer program product according to example embodiments of the invention. It will be understood that each block, step, or operation of the flowcharts, and/or combinations of blocks, steps, or operations in the flowcharts, can be implemented by various means. Means for implementing the blocks, steps, or operations of the flowcharts, combinations of the blocks, steps or operations in the flowchart or other functionality of example embodiments of the invention described herein may include hardware, and/or a computer program product including a computer-readable storage medium having one or more computer program code instructions, program instructions, or executable computer-readable program code instructions stored therein. In this regard, program code instructions may be stored on a memory device, such as memory device 210, of an apparatus, such as apparatus 200, and executed by a processor, such as the processor 205. As will be appreciated, any such program code instructions may be loaded onto a computer or other programmable apparatus (e.g., processor 205, memory device 210) from a computer-readable storage medium to produce a particular machine, such that the particular machine becomes a means for implementing the functions specified in the flowcharts' block(s), step(s), or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s), step(s), or operation(s). The program code instructions may be retrieved from a computer-readable storage medium and loaded into a computer, processor, or other programmable apparatus to configure the computer, processor, or other programmable apparatus to execute operational steps to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide steps for implementing the functions specified in the flowcharts' block(s), step(s), or operation(s).

Accordingly, execution of instructions associated with the blocks, steps, or operations of the flowchart by a processor, or storage of instructions associated with the blocks, steps, or operations of the flowcharts in a computer-readable storage medium, support combinations of steps for performing the specified functions. It will also be understood that one or more blocks, steps, or operations of the flowcharts, and combinations of blocks, steps, or operations in the flowcharts, may be implemented by special purpose hardware-based computer systems and/or processors which perform the specified functions or steps, or combinations of special purpose hardware and program code instructions.

FIG. 11 depicts one or more example methods of the present invention for written mathematical expression analysis. One example method may include receiving written input at 300. The written input may be representative of a mathematical expression. In some example embodiments, the written input may be received from a user via a touch screen display. The example method may also include analyzing the written input to identify at least one operator and at least one operand at 305.

Further, at 310, the example method may include constructing an expression tree based at least in part on predefined symbol relationships, the at least one operator, and the at least one operand. In some example embodiments, constructing the expression tree may include constructing the expression tree as a self-contained complete binary tree. Additionally, or alternatively, constructing the expression tree based at least in part on the predefined symbol relationships may include inserting, based at least in part on the predefined symbol relationships, a placeholder within the expression tree for a missing operator, a missing operand, or a missing parenthesis. Constructing the expression tree may also include constructing a representation of a mathematical expression for display. In this regard, the representation of the mathematical expression may be determined based on a recursive analysis of one or more node tokens and corresponding nodes blocks within the expression tree.

According to various example embodiments, the example method may further include analyzing the expression tree to identify an error based at least in part on one or more predefined rules at 315. At 320, the example method may include providing for display of a feedback message corresponding to the error.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
receiving written input, the written input being representative of a mathematical expression;
analyzing the written input to identify at least one operator and at least one operand;
constructing, via a processor, an expression tree based at least in part on predefined symbol relationships, the at least one operator, and the at least one operand;
wherein constructing the expression tree includes inserting, based at least in part on the predefined symbol relationships, a placeholder within the expression tree for a missing operator, a missing operand, or a missing parenthesis and wherein the placeholder separately identifies whether the placeholder is for a missing operator, a missing operand, or a missing parenthesis;
analyzing the expression tree to identify an error based at least in part on one or more predefined rules; and
providing for display of a feedback message corresponding to the error, wherein the feedback message may include a suggestion for correcting the error.

2. The method of claim 1, wherein receiving the written input includes receiving the written input via a touch screen display.

3. The method of claim 1, wherein constructing the expression tree includes constructing the expression tree as a self-contained complete binary tree.

4. The method of claim 1, wherein constructing the expression tree includes constructing a representation of the mathematical expression for display, the representation of the mathematical expression being determined based on a recursive analysis of one or more node tokens and corresponding nodes blocks within the expression tree.

5. The method of claim 1, wherein display of the feedback message is provided during the receiving of the written input.

6. An apparatus comprising a processor and a memory storing instructions that, in response to execution of the instructions by the processor, cause the apparatus to at least:

receive written input, the written input being representative of a mathematical expression;

analyze the written input to identify at least one operator and at least one operand;

construct an expression tree based at least in part on predefined symbol relationships, the at least one operator, and the at least one operand;

wherein construction the expression tree includes inserting, based at least in part on the predefined symbol relationships, a placeholder within the expression tree for a missing operator, a missing operand, or a missing parenthesis and wherein the placeholder separately identifies whether the placeholder is for a missing operator, a missing operand, or a missing parenthesis;

analyze the expression tree to identify an error based at least in part on one or more predefined rules; and provide for display of a feedback message corresponding to the error, wherein the feedback message may include a suggestion for correcting the error.

7. The apparatus of claim 6, wherein the apparatus caused to receive the written input includes being caused to receive the written input via a touch screen display.

8. The apparatus of claim 6, wherein the apparatus caused to construct the expression tree includes being caused to construct the expression tree as a self-contained complete binary tree.

9. The apparatus of claim 6, wherein the apparatus caused to construct the expression tree includes being caused to construct a representation of the mathematical expression for display, the representation of the mathematical expression being determined based on a recursive analysis of one or more node tokens and corresponding nodes blocks within the expression tree.

10. The apparatus of claim 6, wherein display of the feedback message is provided during the receiving of the written input.

11. A non-transitory computer-readable storage medium comprising a combination of hardware and a computer program product having executable computer-readable program code instructions stored therein, the computer-readable program code instructions configured to:

receive written input, the written input being representative of a mathematical expression;

analyze the written input to identify at least one operator and at least one operand;

construct an expression tree based at least in part on predefined symbol relationships, the at least one operator, and the at least one operand;

wherein constructing the expression tree includes inserting, based at least in part on the predefined symbol relationship, a placeholder within the expression tree for a missing operator, a missing operand, or a missing parenthesis and wherein the placeholder separately identifies whether the placeholder is for a missing operator, a missing operand, or a missing parenthesis;

analyze the expression tree to identify an error based at least in part on one or more predefined rules; and provide for display of a feedback message corresponding to the error, wherein the feedback message may include a suggestion for correcting the error.

12. The non-transitory computer-readable storage medium of claim 11, wherein the computer-readable program code instructions configured to receive the written input include being configured to receive the written input via a touch screen display.

13. The non-transitory computer-readable storage medium of claim 11, wherein the computer-readable program code instructions configured to construct the expression tree includes being configured to construct the expression tree as a self-contained complete binary tree.

14. The non-transitory computer-readable storage medium of claim 11, wherein the computer-readable program code instructions configured to construct the expression tree include being configured to construct a representation of the mathematical expression for display, the representation of the mathematical expression being determined based on a recursive analysis of one or more node tokens and corresponding nodes blocks within the expression tree.

15. The non-transitory computer-readable storage medium of claim 11, wherein display of the feedback message is provided during the receiving of the written input.

16. An apparatus comprising:

means for receiving written input, the written input being representative of a mathematical expression;

means for analyzing the written input to identify at least one operator and at least one operand;

means for constructing an expression tree based at least in part on predefined symbol relationships, the at least one operator, and the at least one operand;

wherein constructing the expression tree includes inserting, based at least in part on the predefined symbol relationships, a placeholder within the expression tree for a missing operator, a missing operand, or a missing parenthesis and wherein the placeholder separately identifies whether the placeholder is for a missing operator, a missing operand, or a missing parenthesis;

means for analyzing the expression tree to identify an error based at least in part on one or more predefined rules; and means for providing for display of a feedback message corresponding to the error, wherein the feedback message may include a suggestion for correcting the error.

17. The apparatus of claim 16, wherein display of the feedback message is provided during the receiving of the written input.

* * * * *

UNITED STATES PATENT AND TRADEMARK OFFICE
CERTIFICATE OF CORRECTION

| | | |
|---|---|---|
| PATENT NO. | : 9,047,267 B2 | Page 1 of 1 |
| APPLICATION NO. | : 12/431908 | |
| DATED | : June 2, 2015 | |
| INVENTOR(S) | : Xie et al. | |

It is certified that error appears in the above-identified patent and that said Letters Patent is hereby corrected as shown below:

In the claims:

Column 15,
Line 8, "wherein construction the" should read --wherein constructing the--.

Signed and Sealed this
Ninth Day of February, 2016

Michelle K. Lee
*Director of the United States Patent and Trademark Office*